United States Patent [19]
Kuipers

[11] 4,017,858
[45] Apr. 12, 1977

[54] APPARATUS FOR GENERATING A NUTATING ELECTROMAGNETIC FIELD

[75] Inventor: Jack Kuipers, Grand Rapids, Mich.
[73] Assignee: Polhemus Navigation Sciences, Inc., Burlington, Vt.
[22] Filed: Feb. 24, 1975
[21] Appl. No.: 552,339

Related U.S. Application Data

[62] Division of Ser. No. 383,688, July 30, 1973, Pat. No. 3,868,565.

[52] U.S. Cl. .......................... 343/100 R; 318/653; 324/34 PS; 324/41; 340/258 C
[51] Int. Cl.$^2$ ................. G01R 33/02; G01S 1/02
[58] Field of Search .... 343/112 D, 108 SM, 100 R; 324/34 PS, 41; 340/258 C; 318/653; 317/155.5

[56] References Cited
UNITED STATES PATENTS

3,121,228   2/1964   Kalmus ..................... 343/112 D
3,838,409   9/1974   Minasy et al. ............... 340/258 C

*Primary Examiner*—Maynard R. Wilbur
*Assistant Examiner*—Richard E. Berger
*Attorney, Agent, or Firm*—Price, Heneveld, Huizenga & Cooper

[57] ABSTRACT

A field (e.g., a magnetic field) which nutates about a pointing vector is used to both track or locate an object in addition to determining the relative orientation of this object. Apparatus for generating such a field includes mutually orthogonal coils and circuitry for supplying an unmodulated carrier, hereafter called DC signal, to one coil and an AC modulated carrier signal, hereafter called AC signal, to at least one (usually two) other coil, such that the maximum intensity vector of a magnetic field produced by the currents in the coils nutates about a mean axis called the pointing vector direction of the field.

4 Claims, 12 Drawing Figures

PRIOR ART

APPARATUS FOR GENERATING A NUTATING ELECTROMAGNETIC FIELD

This is a division of application Ser. No. 383,688, filed July 30, 1973, now U.S. Pat. No. 3,868,565, issued Feb. 25, 1975.

BACKGROUND OF THE INVENTION

I. Field of the Invention

This invention relates to an object locating or tracking system or process in which a vector field which is caused to nutate about an axis called the pointing vector, is used to locate or track a remote object. It also relates to an apparatus for generating such a nutating field, more particularly a nutating magnetic field, which nutates about an axis called the pointing vector. More particularly, the invention relates to such a system or process wich is capable of determining both the relative translation and the relative angular orientation of the coordinate frame of a remote object, relative to the reference coordinate frame of the apparatus which generates and points the nutating field.

II. Description of the Prior Art

The use of orthogonal coils for generating and sensing magnetic fields is well known. Such apparatus has received wide attention in the area of mapping magnetic fields to provide a better understanding of their characteristics, for example. If a magnetic field around generating coils can be very accurately mapped through use of sensing coils, it has also been perceived that it might be possible to determine the location of the sensing coils relative to the generating coils based on what is sensed. However, a problem associated with doing this is that there is more than one location and/or orientation within a dual magnetic dipole field that will provide the same characteristic sensing signals in a sensing coil. In order to use a magnetic field for this purpose, additional information must therefore be provided.

One approach to provide the additional information required for this purpose is to have the generating and sensing coils move with respect to each other, such as is taught in U.S. Pat. No. 3,644,825. The motion of the coils generates changes in the magnetic field, and the resulting signals then may be used to determine direction of the movement or the relative position of the generating and sensing coils. While such an approach removes some ambiguity about the position on the basis of the field sensed, its accuracy is dependent on the relative motion, and it cannot be used at all without the relative motion.

Another approach that has been suggested to provide the additional required information is to make the magnetic field rotate as taught in Kalmus, "A New Guiding and Tracking System", IRE Transactions on Aerospace and Navigational Electronics, March 1962, pages 7 – 10. To determine the distance between a generating and a sensing coil accurately, that approach requires that the relative orientation of the coils be maintained constant. It therefore cannot be used to determine both the relative translation and relative orientation of the generating and sensing coils.

While the art of locating and tracking remote objects is a well developed one, there still remains a need for a way to determine the relative angular orientation of a remote object in addition to locating or tracking the object. Further, there is a need for a means, system or process which operates on the signals detected by one sensor, those signals resulting from the nutating field generated by one generating means, which is capable of determining continuously the location of or tracking the remote object and sensor, in addition to simultaneously determining continuously the relative angular orientation of the remote object and sensor.

SUMMARY OF THE INVENTION

Accordingly, it is an object of this invention to provide a system and process capable of determining both relative translation and relative orientation of remote objects through the use of a vector field.

It is another object of the invention to determine relative translation and orientation of remote objects through use of a field in a continuous manner, so that translation and orientation may be tracked and therefore determined continuously.

It is a further object of the invention to provide a system and process for locating an object precisely relative to a reference coordinate frame of the vector field generating means.

It is still another object of the invention to provide a system in which a pointing vector defined by a modulated field is used to track an object very precisely.

It is a still further object of the invention to provide a generator capable of producing electronically a field which nutates about a specified pointing vector, which field can be used in the above system and process.

It is therefore, also an object of this invention to set forth an efficient signal processing technique which results in the measure of the relative translation of a remote object (two angles) in addition to the simultaneous measure of the relative angular orientation of the remote object (three angles). That is, the invention provides a means for measuring five independent angular measurements utilizing only one field generating means and only one sensing means at the remote moving object.

The above and related objects may be attained through use of the system process anf field generating apparatus described herein. This invention is based on the realization that the only positions in a nutating dipole field where the field strength is magnitude invariant lie along the axis of nutation, herein called the pointing vector. This phenomenon allows very precise location or tracking of a remote object that is free to undergo not only changes in position but also changes in angular orientation.

A system in accordance with the invention has means for generating a directable, nutating field, such as a magnetic field, about a pointing vector. Means is provided at the remote object to be located or tracked for sensing the field.

If the system is used to locate the object only, say for small perturbations in pointing angle, means is provided for generating a signal based on the sensed field for indicating the location of the object. If the system is used to track the object, a signal generating means is connected between the sensing means and the field generating means which provides a signal to the field generating means, based on the sensed field, for moving the pointing vector of the nutating field toward the sensing means. Preferably, orthogonal coils are used both in the generation of the nutating field — in which case it is an electromagnetic field — and in the sensing of the resulting field.

The system includes:

1. An apparatus for generating and pointing the nutating field at the object.
2. Means located at the object for sensing the field.
3. Means for converting signals generated or detected by the field sensing means to:
   a. provide an indication of the two angles defining the direction of the object relative to the coordinates of the generating means;
   b. provide a measure of the three Euler angles defining the orientation of the object (sensor) relative to the coordinates of the generating means.
4. Means for supplying correction signals to the field generating means suitable for continuously moving the pointing vector such that the sensing means is caused always to lie on the pointing vector. The process for locating or tracking the object includes generating a field which nutates about a pointing vector. The generated field is sensed in at least two orthogonal directions at the object to be tracked and whose orientation is to be determined. The orthogonal axes of the sensing means are fixed to and usually oriented to coincide with the principal axes of the object being tracked and orientation angles being determined, for computational convenience in determining the two tracking angles and three orientaton angles. An error in the direction of the pointing vector, which means that the vector is not pointing directly at the object, is related to the amplitude of the AC signal (nutation frequency) detected by the sensing means at the object, in the direction of the pointing vector. An error in the computed orientation angles of and at the sensing means at the object is related to the DC signal measured in directions orthogonal to the pointing vector direction determined at the sensing means, and the relative phase of the AC signal.

Means, system and process are described, thus, capable of continuously measuring five independent angles through the use of one field generating means, one field sensing means at the object, and signal processing means. Two of the angles specify the direction to or location of the remote object and the remaining three angles define the angular orientation of the remote object, all angles being measured with respect to the fixed reference coordinate frame of the field generating means.

BRIEF DESCRIPTION OF THE DRAWINGS

FIG. 4b illustrates the circuit corresponding to the pointing angles of FIG. 4a;

DETAILED DESCRIPTION OF THE INVENTION

Apparatus in accordance with the invention for generating a directable, nutating, magnetic field along a pointing vector includes at least two orthogonally positioned coils through which excitation currrents can be passed. This excitation current will usually be operating at some specified carrier frequency which is modulated by a direct current (DC) signal and/or an alternating current (AC) signal. Hereinafter, these modulation envelopes will be referred to only as DC signal or AC signal. The AC signal is at the nutation frequency. Circuitry for supplying a DC current through one of the coils and an AC current through at least one additional orthogonally positioned coil produces a nutating magnetic field whose pointing vector is in the direction of the axis of the DC coil, or more properly stated, in the direction of the axis of the DC field. The amplitude of the nutation depends on the relative amplitude of AC and DC signals, in most cases taken to be equal in amplitude. If the object can move in only two dimensions, the nutation need only be a simple nodding in the plane of the motion. This can be produced by a DC signal in one of the coils and an AC signal in the second coil, with both coils in the plane of the motion. If the object is free to move in three dimensions, the nutation desirably describes a conical motion about the pointing vector of the field, the conical apex at the intersection of the coils. Such a nutating field can be generated by the combination of a DC signal in one of the coils, an AC signal in a second coil, and another AC signal having a phase in quadrature with the phase of the first AC signal, passed through the third coil, all three coils being mutually, spacially orthogonal.

In both the 2-D and 3-D nutating fields described above, the pointing vector is fixed to the direction of the axis of the DC field. To make this nutating field directable, a signal processing means known as a coordinate transformation circuit must operate on the reference AC and DC excitation signals in order to point the nutating field in the desired direction. A brief discussion of the coordinate transformation known as a rotation is presented as background in order to properly teach the principles underlying the techniques employed in this invention.

Figure 1:
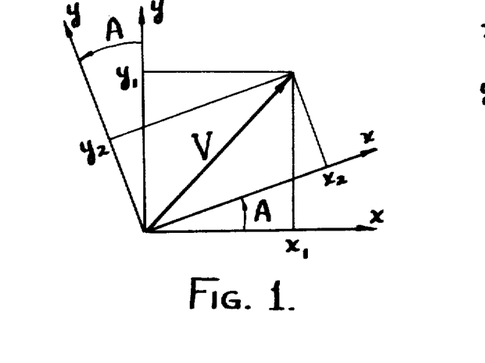
FIG. 1 describes the geometry of a simple coordinate transformation called a rotation.
Figure 2:
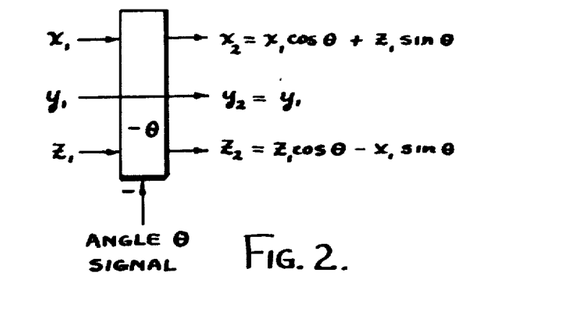
FIG. 2 is the block diagram representation of a single rotation operator, as in FIG. 1, called a Resolver.

A vector transformed by pure rotation from one coordinate frame into another coordinate frame is also said to be resolved from the one into the new coordinate frame. Resolve and resolution in this context are synonyms for transform and transformation. The operator which transforms the components of a given vector in one coordinate frame into its components in another coordinate frame where the two coordinate frames are related by a simple angular rotation is defined as a resolver. The equations governing this transformation are:

$x_2 = x_1 \cos A + y_1 \sin A$
$y_2 = y_1 \cos A - x_1 \sin A$
$z_2 = z_1$ where in this case the $z_1$ axis is the axis of rotation. The equations are readily verified from the geometry illustrated in FIG. 1. Note that when the two components operated on by the resolver are ordered positively (zxyzxy . . . )then the first component of the positively ordered pair always has the positive sine term when the angle of rotation is positive. If the angle or rotation is negative then the sign of the sine terms reverses. A convenient notation for a resolver is the block shown in FIG. 2 where the rotation in this case is shown as negative about the y-axis. The y component is therefore not affected by the transformation and this fact is indicated in this notation by passing that component directly through the box as shown whereas, the resolver block representing FIG. 1 would show the $z_1$ axis passing directly through the box. This notation should be regarded as a signal flow or block diagram for vector components, particularly useful in describing the computational strategy employed in this invention.

Figures 3, 4A:
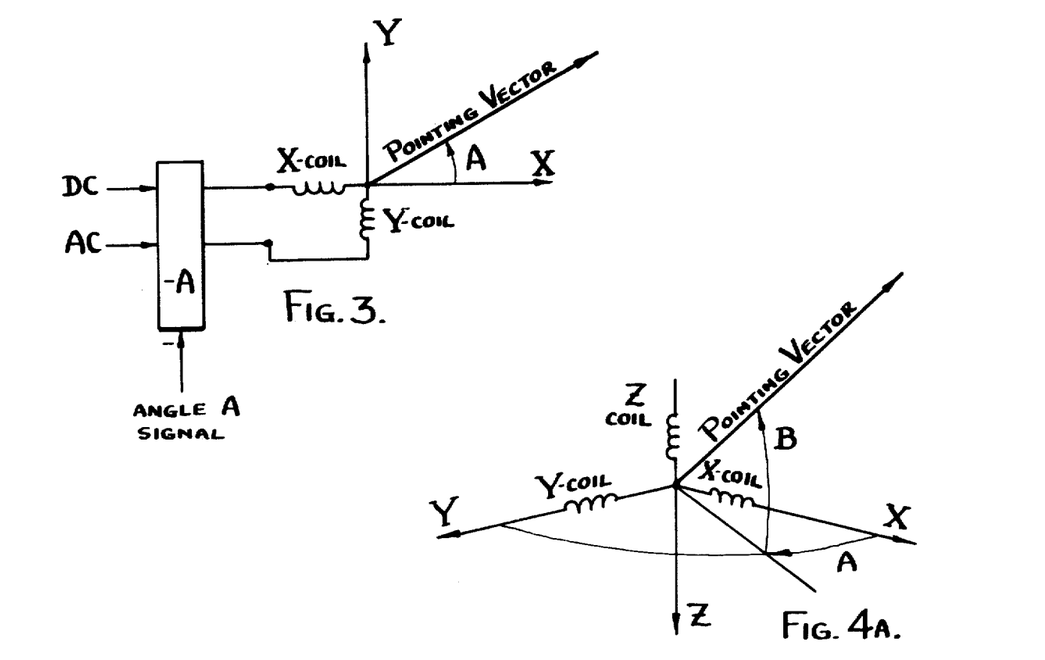
FIG. 3 shows the circuit giving 360° pointing freedom to the two-dimensional nutating magnetic field in the plane.
FIG. 4a shows the pointing angles defined for three-dimensional pointing.
Figure 4B:
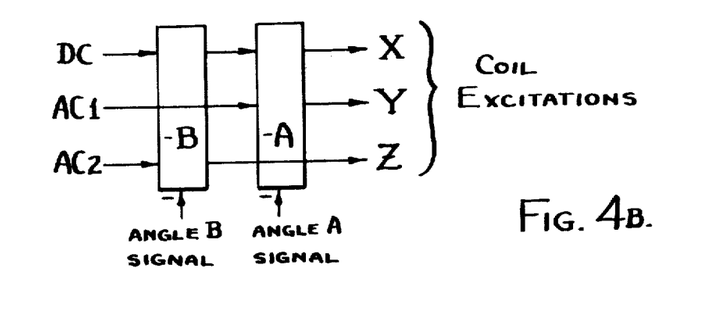

A process in accordance with the invention includes the generation of a directable, nutating field, nutating about an axis called the pointing vector. In the 2-D case, a single resolver operates on the AC and DC orthogonal components of the reference nutation excitation vector in order to produce the proper mixture of AC and DC on each of the two generator coils such that the pointing vector, along with the entire nutating magnetic field structure, is directed so as to make an angle A with the reference X-axis, as shown in FIG. 3. The excitation for the two generator coils necessary to direct the pointing vector in the required direction defined by the angle A is given by the equations:

Excitation for X-coil = (DC)cosA − (AC) sinA
Excitation for Y-coil = (AC)cosA + (DC)sinA The computational circuitry necessary for precisely directing or pointing the nutating magnetic field for the 3-D case operates, in principle much the same as in the 2-D case. The reference nutation excitation vector now consists of three components: A DC and two AC signals quadrature related. The pointing vector and its entire nutating magnetic field structure are pointed in any desired direction defined in terms of angles A and B, in this case. FIG. 4 illustrates the pointing geometry and the computational coordinate transformation circuitry necessary for achieving the desired pointing direction by operating on the given three reference excitation signals. A more detailed explanation of coordinate transformations, calculations and applications is contained in kuipers, J., *Solution and Simulation of Certain Kinematics and Dynamics Problems Using Resolvers*, Proceedings of the Fifth Congress of the International Association for Analog Computation, Lausanne, Switzerland, Aug. 28 – Sept. 2, 1967, pages 125 – 134, the disclosure of which is incorporated by reference herein.

A process in accordance with the invention includes the generation of a field which nutates about a pointing vector. The generated field is sensed in at least two axes at the object to be located or tracked. From the processed relationship between the field components sensed in each of the orthogonal axes, the position of the object relative to the pointing vector of the field is determined to locate the object. To track the object, the pointing vector of the nutating field is moved until the field sensed on the two axes, after appropriate coordinate transformation processing, indicates that the object lies along the pointing vector. This has taken place when the processed signal resulting from the sensed nutating field is magnitude invariant over the nutation cycle. If a pointing error exists, then the amplitude of the modulation sensed in the pointing direction is proportional to the angular displacement of the object from the pointing vector. More specifically, the relative phase of the detected and processed signals compared to the reference field generating signals is proportional to the direction of the object relative to the pointing vector. The modulation amplitude of the sensed and processed signal, in the pointing vector direction is proportional to the angular displacement from the pointing vector.

The above discussion explains that the pointing vector can continuously track the object. This results in two angular measures defining the location of the object. Determination of the angular orientation of the object is however an independent matter. The orientation of the object is specified in general by three Euler (see Kuipers's referenced paper) angles measured relative to the reference coordinate frame at the generator. Two of the error measures of angular orientation are proportional to whatever non-zero projections of the sensed and processed DC field component exist in the coordinate directions of the plane perpendicular to the pointing direction. The third angular error measure is proportional to the relative phase of the sensed and processed nutation signals in this orthogonal plane, compared to the nutation reference excitation at the generator means.

This system, apparatus for generating a nutating field about a pointing vector, and process allows a remote object to be located and tracked very precisely, both as to position and angular orientation. While the invention should find application in a wide variety of situations where remote object location or tracking coordinates, in addition to the orientation angles of the object, is required, it is particularly adapted in its present preferred form for use in tracking the position and angular orientation of an observer's head, more specifically his line-of-sight, for visually-coupled control system applications. In this limited application, the pilot's line-of-sight is continuously and precisely defined relative to the coordinates of the aircraft. Many other applications such as automatic landing or docking, remotely piloted vehicles, automatically negotiated air-to-air refuelling, formation control, etc. are all applications operating over much larger domains. In general, any situation involving two or more independent bodies or coordinate frames, wherein it is desired not only that the relative distance or location of the frames be measured, tracked and controlled precisely but also that it is desired simultaneously and with the same device to precisely measure, track and control the relative angular orientation of the two frames, is a potential application of this invention.

Figures 5, 6, 7:
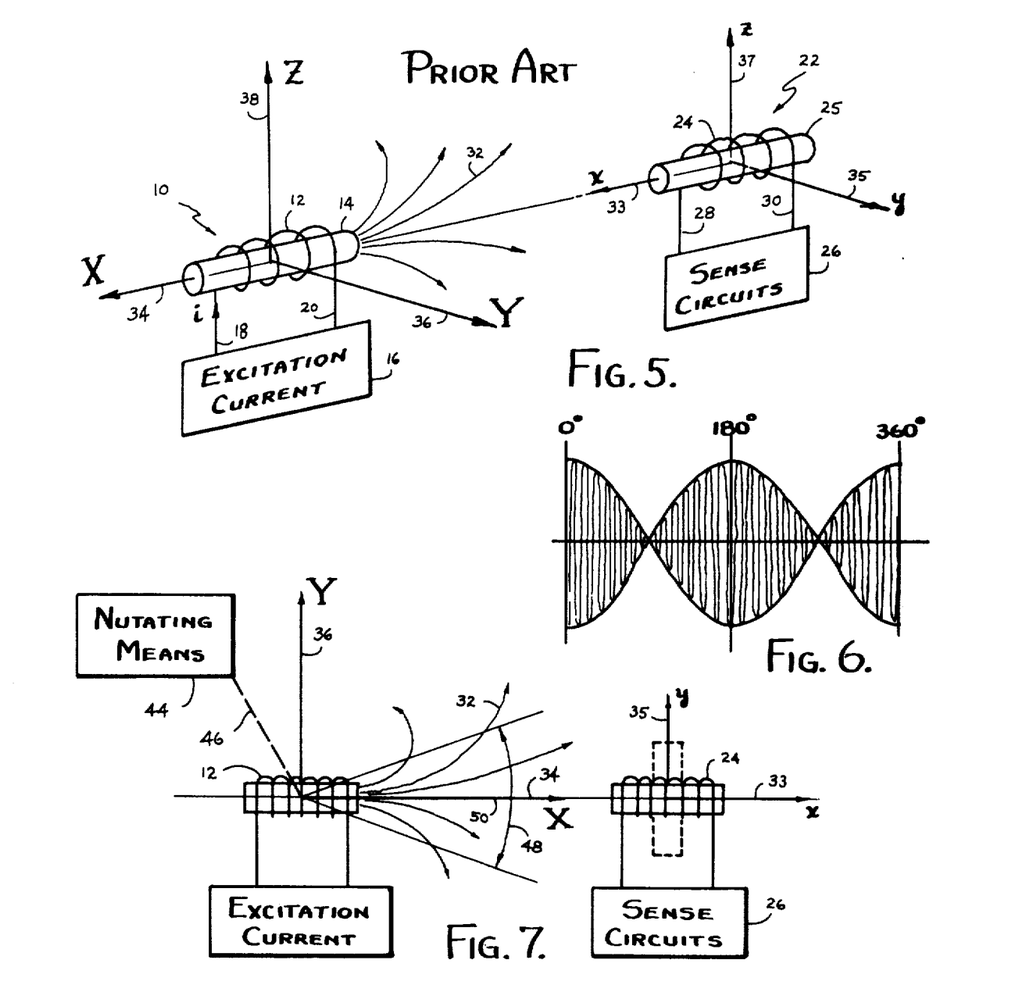
FIG. 5 is a schematic representation of a prior art magnetic field generating and sensing system.
FIG. 6 is a representation of signals sensed in the system of FIG. 5.
FIG. 7 is a schematic representation of a system which will allow practice of the invention for determining location and orientation of an object which moves in two-dimensions.

Referring now particularly to FIG. 5, the elements of a prior art magnetic field generating and sensing system which cannot be used to locate, track or determine the orientation of an object, are shown. Included is a magnetic field generator 10 having a coil 12 wound of copper or other conducting wire on a magnetic, preferably isotropic, core 14. A source 16 of current $i$ at some conveneint carrier frequency, is connected to the coil 12 by leads 18 and 20. Sensor 22 has a coil 24 wound preferably also on a magnetically isotropic core 25, as in the case of the generating coil 12. Sense circuits 26 are connected to the coil 24 by leads 28 and 30.

In use in accordance wit prior art techniques, the passage of current *i* through coil 12 creates a magnetic field 32. Coil 24 of sensor 22 is moved to different points around the generating coil 12, and currents induced in the coil 24 provide a measure of the strength of the magnetic field 32 at the different points. With reference to the reference coordinate axes 34, 36, and 38, in addition to simple translation of coil 24 in the directions X, Y and/or Z, the coil 24, whose coordinate axes are 33, 35 and 37, may assume different relative angular orientations by rotations about these axes *x*, *y* and/or *z*.

FIG. 6 shows the output signal at coil 24 measured by sense circuit 26 for a given field 32 generated by current *i* flowing through the coil 12, as coil 24, is rotated for 360° about either the *y* axis 35 or the *z* axis 37. In fact, coil 24 could be translated to uncountably many points around coil 12 where the above rotations of coil 24 would again give the same output signal shown in FIG. 6. This demonstrates simply why the prior art apparatus cannot be used to uniquely define the relative position of nor the relative angular orientation of the sensing coils 24 with respect to coil 12.

Figure 8:
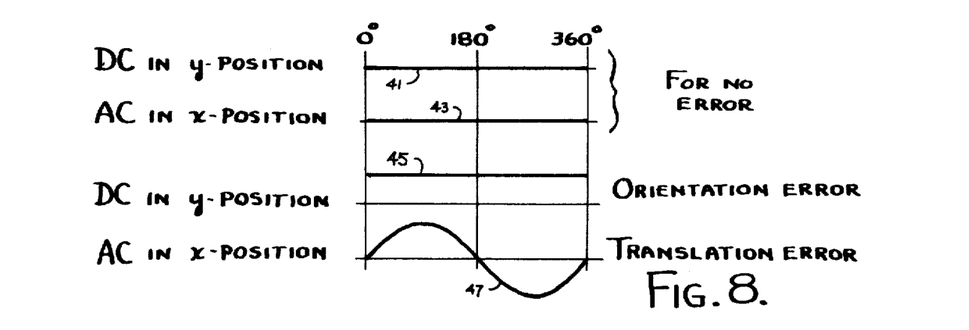
FIG. 8 is a representation of signals sensed in the system of FIG. 7.

FIGS. 7 and 8 show coil 12 which nutates the field 32 in a simple nodding motion, induced by nutating means 44 connected to coil 12 by line 46, through a predetermined angle 48, e.g., 45°, and the resulting output curves as sensed by circuits 26. The translation and rotation motions to be considered are restricted to the X—Y plane. The curves of FIG. 8 illustrate the basis underlying strategy in the subject invention. In FIG. 7 note that two orthogonal angular orientations are shown for the sensor coil 24. In each of these two orientations there is, in general, an AC and a DC component induced in coil 24. When coil 24 is aligned with the *y*-axis which is assumed to be othogonal to the pointing axis 50, the induced signal consists of a zero AC component at the functional nutation frequency and a zero DC component. When coil 24 is aligned with the *x*-axis, which is coincident with the pointing axis 50, the induced signal consists of the entire DC component and again zero AC at the fundamental nutation frequency. The two pertinent signals for determination of relative orientation and translation, are the DC signal induced in coil 24 when in the *y*-position and the AC signal when the *x*-position. Both are zero as illustrated in the first two curves of FIG. 8 when there is no orientation or translation error.

If a translation error exists then the sensor coil 24, in the x position, will sense some AC signal 47 at the fundamental nutation frequency. The magnitude of this signal wll be proportional to the magnitude of the translation error; its phase, either 0° or 180°, will indicate the direction of the error.

If an orientation error exists, then the sensor coil 24 in the *y* position will sense some DC signal 45. The magnitude and polarity of this DC signal will indicate the magnitude and direction of the orientation error, respectively.

The apparatus of FIG.7 will allow practice of the process of the invention to determine the location and orientation of coil 24 by alternately positioning the coil 24 along the *x* and *y* axes, assuming freedom to move or orientate the coil 24 alternately to coincide with the *x* and *y* axes. If movement occurs in each of the X, Y and Z directions, that is, in all three dimensions, then more than a simple planar nutation in the X-Y plane is required to characterize that movement, as will be considered in more detail below. In the X-Y plane, however, rather than a successive positioning of the coil 24, it is far simpler to utilize two orthogonal coils as in the apparatus of FIG. 9. Therefore, coil 24 of FIG. 7 has been replaced by orthogonally positioned coils 52 and 54, each connected to sense circuits 26 by leads 56 and 58, and 60 and 62, respectively. While nutation of the field 32 in FIG. 7 through the angle 48 can be accomplished by any convenient method, such as by means 44 giving a mechanical nutating motion of the coil 12 in FIG. 7, it is best accomplished electrically, utilizing a pair of coils 64 and 66, also orthogonal. Current sources 68 and 70 are connected to each of these coils by leads 72 and 74 and 76 and 78, respectively. As shown, current source 68 supplies a DC signal *i* to coil 64, and current source 70 supplies an AC signal, say Msin wt, to coil 66. These signals can be either simple DC and AC or may be both superimposed on a suitable carrier frequency such as 10 kilohertz, in which case the terms AC and DC pertain to the modulation envelope defining each curve. In either case, the resulting magnetic field in the apparatus of FIG. 9 will nutate about a pointing axis 80 which is always coincident with the axis of the coil 64 as the AC signal in coil 66 produces an alternating magnetic field which adds vectorially to the magnetic field generated by the DC signal in coil 64.

Figure 9:
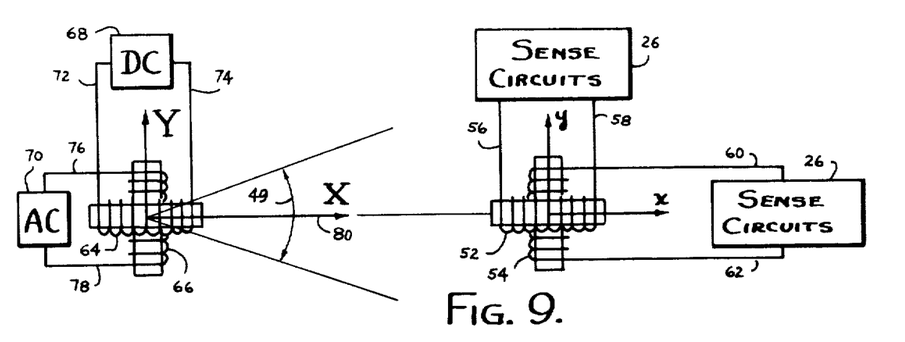
FIG. 9 is a representation of a simplified two-dimensional system using a two-coil generator and a two-coil sensor.

In practice, an object having orthogonal sensing coils 52 and 54 mounted on its is free to move anywhere in the plane defined by the axes of the coils. If the system is to track the object, generating coils 64 and 66 should have the capability to generate a magnetic field which nutates about a pointing vector 80, with a peak-to-peak angular nutation amplitude 49, in which the pointing vector 80 does not coincide with the axis of coil 64. Such a magnetic field can be created by supplying the appropriate mixtures of the AC and DC signals to coil 64 and to coil 66. As was described earlier, the amplitude 44 of nutation angle depends upon the relative amplitude of the reference DC and AC sources, 68 and 70, respectively. The angle that the pointing vector 80 makes with the reference *x*-axis of the coil 64 is governed by the mixing process performed by the resolver circuit or process suggested in the discussion related to FIG. 3, inserted in the leads 72, 74, 76 and 78 between sources 68 and 70, and coils 64 and 66, respectively. The resolver operates on the fixed reference DC and AC signals from sources 68 and 70, such that the processed signals received from the resolver for exciting the generator coils 64 and 66 now have the capability of directing the pointing vector 80 of the nutating field, at any desired angle A, through a full 360°, in accordance with the equations Excitation of coil 64 = (DC)cosA − (AC)sinA
Excitation of coil 66 = (AC)cosA + (DC)sinA In order to provide sufficient information for tracking in a plane the position and the angular orientation of an object having sensing coils 52 and 54 mounted on it, the sense circuits 26 should have the capability to detect, after coordinate rotation processing of the signals induced in the sensing coils 52 and 54, the AC error component in the pointing vector direction and the DC error component in the direction orthogonal to the pointing vector. The relative phase and amplitude of the above mentioned AC error is proportional to the direction and magnitude of the pointing error. The polarity and magnitude of the above mentioned DC error component is proportional to the direction and magnitude of the error in the computed orientation angle of the remote object. These two error signals, which are proportional to the angular error in the pointing angle and to the angular error in the relative orientation angle of the object, respectively, are used to make corrections in the previous measure of these two angles. The change in the pointing angle will shift the pointing vector until the sensor coils 52 and 54 lie along it, at which time the AC error signal, measured in the direction of the pointing vector 80 will be zero. The indicated change required in the orientation angle will improve or correct the computed orientation angle which represents the relative coordinate relationship between the coordinate frame of the generator coils 64 and 66, and the coordinate frame of the sensor coils 52 and 54. If this relationship is properly represented in the signal processor, by the orientation angle resolver 0, then the DC error signal detected in the direction orthogonal to the pointing vector 80, will be zero.

Figure 10:
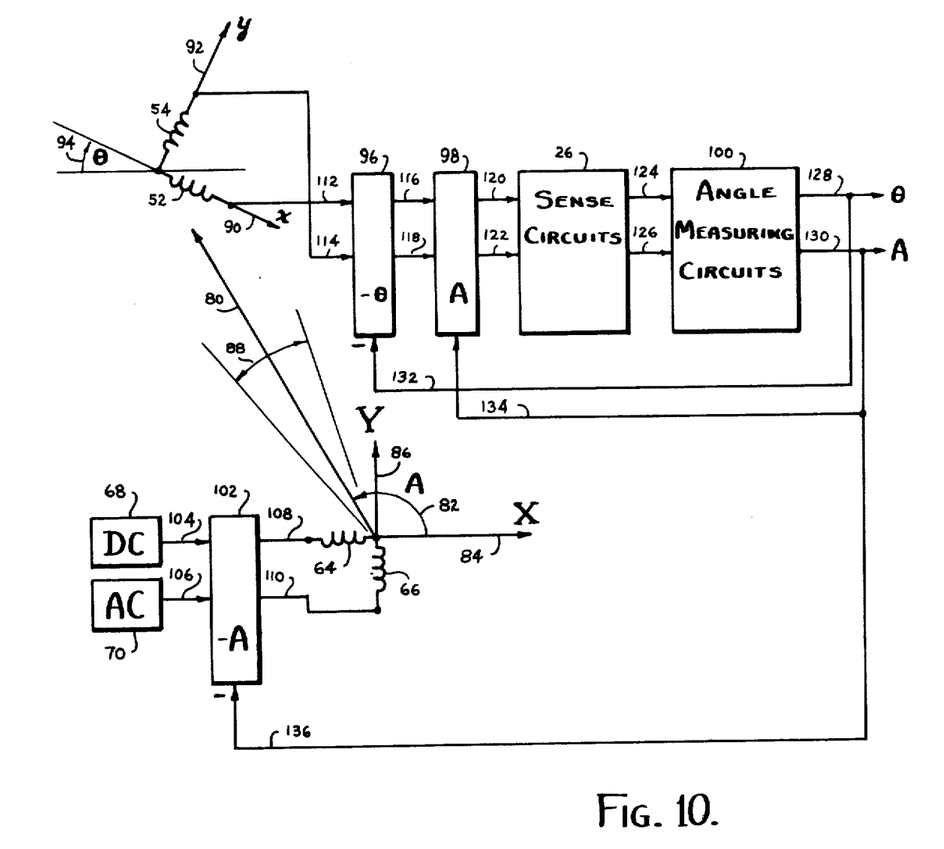
FIG. 10 is a schematic representation of a system in accordance with the invention which will track the location and the angular orientation of an object free to move in two-dimensions.

In summary, and with added reference to FIG. 10, apparatus in accordance with the invention, for continuously tracking the relative location or direction and the relative angular orientation between two independent bodies in a plane, is described. The reference coordinates of the plane are defined by the X-axis 84 and the Y-axis 86 which are coincident with the field generating coils 64 and 66, respectively. Both the translation and the orientation angles will be measured with respect to this reference coordinate frame. The sensor coils 52 and 54 are fixed to the remotely moving object, and their mutually orthogonal axes 90 and 92 define the coordinate frame of the object to be tracked both as to location and orientation. In order to generate a nutating magnetic field pointed in a prescribed direction relative to the fixed coordinate frame of the generator coils 64 and 66, a particular mixture of DC and AC excitation signals is required in each of the generating coils. The resolver 102 processes the reference DC and AC excitation signals received on leads 104 and 106 from sources 68 and 70, respectively, in accordance with the presumed input pointing angle A 82, to give the appropriately mixed resolver output excitation signals which are connected by leads 108 and 110 to the generator coils 64 and 66, respectively, such that the pointing vector 80 and its attendant nutating field structure makes the angle A with respect to the reference X-axis. The generated nutating field points nominally at the sensor coils 52 and 54. The peak-to-peak amplitude of the nutation 88 is fixed, usually 45 to 90°, and depends upon the relative magnitude of the two fixed reference DC and AC excitation signals from sources 68 and 70. It is clear that the signals induced in the sensor coils 52 and 54 depend not only on the pointing angle A but also on the relative orientation angle 0 94. It is for this reason that the induced signals in coils 52 and 54 are connected by leads 112 and 114 to resolver 96 to be processed by resolver 96 which removes or unmixes that part of the AC and DC mixing of the two signals that is attributable to the non-zero orientation angle θ 94. The two output signal components from resolver 96 are connected by leads 116 and 118 to resolver 98 which further unmixes the DC and AC signals mixing that was necessary to achieve the desired pointing angle A 82. If the presumed pointing angle A and the presumed orientation angle θ are correct, then the output components from resolver 98 will be totally unmixed. That is, there will be no AC modulation error on the nominal DC output signal 120 which indicates that there is no pointing error, and also there will be no DC component on the nominally AC signal 122 which indicates that the computed orientation angle is correct. In the event that the angles θ and/or A are incorrect, as will be the case, since very small errors are expected, when operating under dynamically changing circumstances, then sense circuits 26 will detect the AC and DC errors on lines 120 and 122, respectively, relate them to errors in the angles θ and A, respectively, and on leads 124 and 126 introduce the corresponding incremental changes accumulated by Angle Measuring Circuit 100, in the respective angles. These improved angle measures of θ and A are connected to the appropriate resolvers employed in this embodiment on leads 132, 134 and 136 in a stable feedback arrangement. That is, the corrections made in the outputs 128 and 130 tend to reduce the errors measured on components 124 and 126. These principles can be extended to applications in three dimensions by employing the system shown in FIG. 11.

Figure 11:
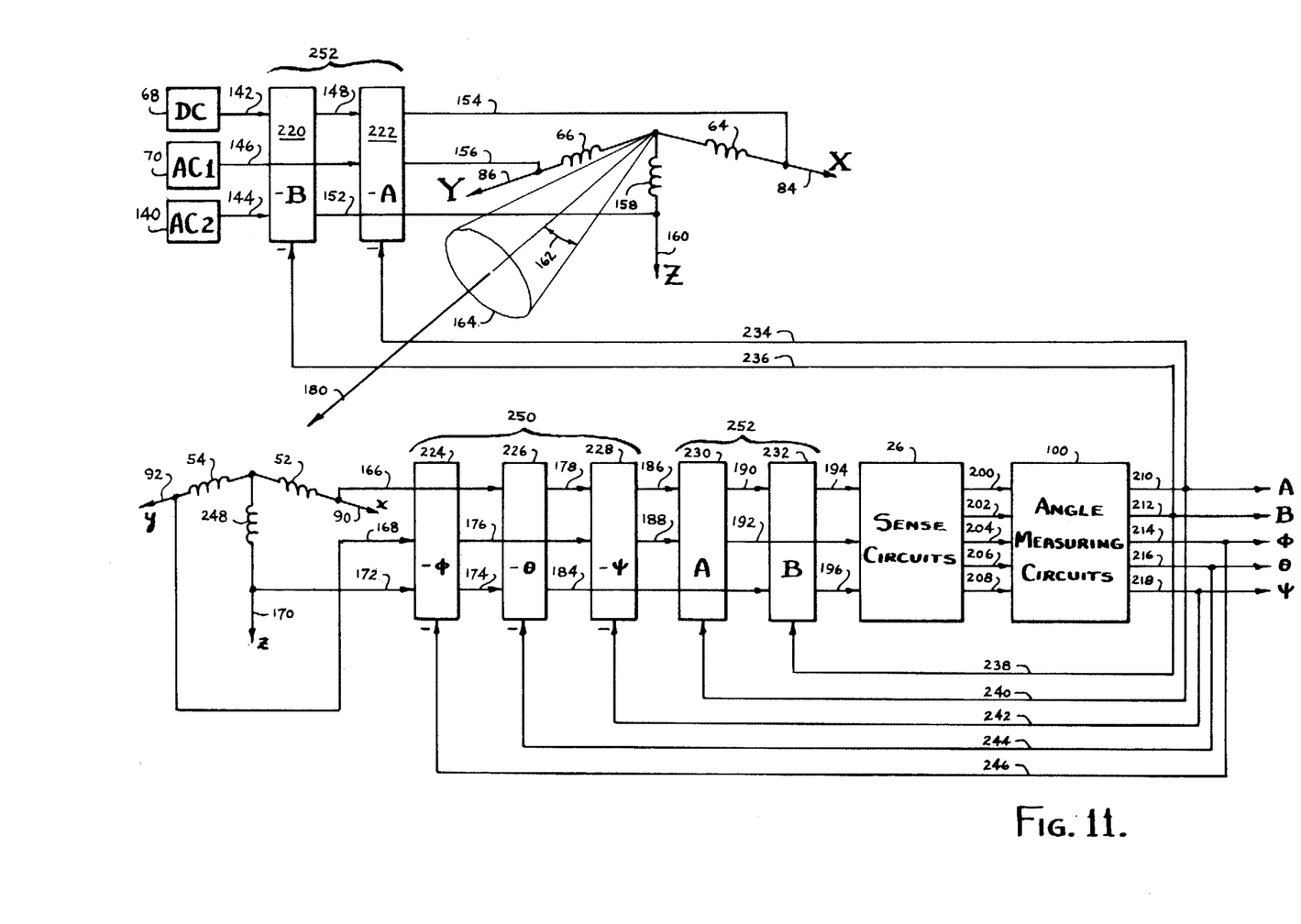
FIG. 11 is a schematic representation of a system in accordance with the invention which will track the location or direction and the relative angular orientaton of an object free to move in three-dimensions, subject to certain restraints.

As in the system of FIG. 10, the system of FIG. 11 includes magnetic field generating coils 64 and 66 and magnetic field sensing coils 52 and 54. A third magnetic field generating coil 158, which is mutually orthogonal to coils 64 and 66, and a third magnetic field sensing coil 248, which is mutually orthogonal to coils 52 and 54, is provided in order to measure information in the third dimension. For ease of understanding, the three coils in each case have been shown as spacially separated. In actuality, the magnetic axes of both the generator coils and the sensor coils intersect in a mutually orthogonal relationship as shown by the cartesian coordinate frames 84, 86, 160, and 90, 92, 170, respectively. It should also be noted that an additional AC reference excitation signal has been provided such that AC1 and AC2 are quadrature related or 90° phase related. They may be considered as sinusoids of equal amplitude but 90° out of phase, although the two reference AC1 and AC2 signals need not necessarily be sinusoidal in the practical embodiment of the system. Reference is again made to FIG. 4 which was related to the earlier discussion of coordinate transformation circuitry and which shows the three dimensional pointing geometry. As in the case of the two dimensional embodiment shown in FIG. 10, the ability to point the pointing vector 180 in any direction in which the assembly of sensing coils 52, 54 and 248 are free to move enables the sensing coils to be tracked. The reference excitation DC, AC1 and AC2 signals from sources 68, 70 and 140, respectively, define a conically nutating 164 magnetic field about a pointing axis 180 which is coincident with the axis of the DC component of the field. It should be emphasized again that the pointing of the vector 180 is accomplished electrically by the circuit to be described while the generating coils 64, 66 and 158 maintain a fixed orientation physically. DC source 68 and AC2 source 140 are connected by leads 142 and 144, respectively, to resolver 220, whose output lead 148 and output lead 146 from AC1 source 70 are connected to resolver 222. The output leads 154 and 156 provide the excitation signals from resolver 222 to generator coils 64 and 66, respectively. Generator coil 158 is excited through connection 152 from the output of resolver 220. The two angles A and B of resolver 222 and 220, respectively, are thus operating on the reference nutating field vector input whose components are the reference excitations from sources 68, 70 and 140, so as to point the pointing vector 180 and its attendant nutating field structure in accordance with the geometry shown in FIG. 4. The pointing vector 180 is presumed to be pointing nominally at the sensor which is fixed to the remote object to be tracked by the system. The sensor consists of the three mutually orthogonal sensor coils 52, 54 and 248, which are fixed to the remote object and in the preferred embodiment are aligned to the principal axes of the remote object, so that in the process of determining the orientation of the sensor triad the orientation of the remote object is therefore determined. As in the discussion of the two dimensional case, illustrated in FIG. 10, the signals induced in the sensor coils 52, 54 and 248 depend on the orientation of their sensor coordinate frame, defined by the mutually orthogonal coordinate axes 90, 92 and 170, relative to the pointing axis 180 and its two orthogonal nutation components of the nutating field. In other words, the particular mixing of the three reference excitation signals DC, AC1, and AC2 from sources 68, 70 and 140, induced in each of the three sensor coils 52, 54 and 248, depends not only upon the two pointing angles A and B which govern the composite pointing coordinate transformation circuit 252 but also upon the three Euler angles defining the relative angular orientation of the remote object and which govern the composite orientation coordinate transformation circuit 250. The principal function of the two coordinate transformation circuits 250 and 252 in the overall computational strategy of the system is that the transformation circuit 250 unmixes that part of the reference signal mix induced in the sensor coils attributable to the relative orientation of the remote object, and coordinate transformation circuit 252 unmixes the remaining part of the reference signal mix that was due to the pointing angles. If the three orientation angles defining coordinate transformation circuit 250 and the two pointing angles defining the coordinate transformation circuit 252 properly represent the physical relationship between the sensor and generator coordinate frames, then the signals sensed by the sense circuits 26 will correspond to the unmixed reference signals DC, AC1 and AC2, respectively, from sources 68, 70 and 140.

The sensor coils 54 and 248 are connected to resolver 224 by leads 168 and 172, respectively. The output of sensor coil 52 and one output from resolver 224 connect to resolver 226 by leads 166 and 174, respectively. One output from resolver 224 and one output from resolver 226 connect to resolver 228 by leads 176 and 178, respectively. The two outputs from resolver 228 are connected to resolver 230 by leads 186 and 188, respectively. One output from resolver 226 and one output from resolver 230 connect to resolver 232 on leads 184 and 190, respectively. One output from resolver 230 and the two outputs from resolver 232 provide the processed signal inputs to sense circuits 26 by connections 192, 194 and 196, respectively. Sense circuits 26 operates on the three input signals provided by leads 194, 192 and 196, to sense deviations from their nominally correct values which should correspond to the reference excitation signal components 68, 70 and 140, respectively. The signal sensed on lead 194 should be nominally DC. If lead 194 contains an AC error signal at the nutation frequency then a pointing error exists, that is, the pointing vector 180 is not pointing precisely at the sensor coils 52, 54 and 248. That portion of the AC error signal, detected on lead 194 that is of the same absolute phase as the excitation signal 146, is proportional to an error in the pointing angle A. This pointing angle error in A is connected to the angle measuring circuits 100 by lead 200. That portion of the AC error signal detected on lead 194 that is of the same absolute phase as the excitation signal 144, is proportional to an error in the pointing angle B. This detected error in pointing angle B is connected to the angle measuring circuits 100 by lead 202. The signal that appears on lead 192 should be nominally AC at the nutation frequency and no DC signal. Whatever DC signal appears on lead 192 is proportional to an orientation angle error in the angle $\Psi$, called the relative bearing angle. This detected error in the relative bearing angle $\Psi$, is connected to the angle measuring circuits by lead 208. The signal that appears on lead 196 should also be nominally AC at the nutation frequency and should contain no DC. Whatever DC signal is present on signal lead 196 is proportional to an error in the relative orientation angle $\theta$, called the relative elevation angle. This error in the relative elevation angle $\theta$, is connected to the angle measuring circuits 100 by lead 206. As mentioned above, the nominal signals appearing on leads 192 and 196 are not only characterized as being AC at the nutation frequency but also quadrature related as are their nominal reference signal counterparts AC1 and AC2. Moreover, whatever phase difference exists between the signal on lead 192 and signal source 70, or alternatively, whatever phase difference exists between the signal on lead 196 and signal source 140, is proportional to an error in the relative orientation angle $\phi$, called the relative roll angle. This error in the relative roll angle $\phi$, is connected to the angle measuring circuit 100 by lead 204. The function of the angle measuring circuits 100 is to provide correct or corrected measures of the two pointing angles A and B on leads 210 and 212, respectively, based upon the angular errors sensed by sense circuits 26. Another function of the angle measuring circuits 100 is to provide correct or corrected measures of the three relative orientation angles $\phi$, $\theta$ and $\Psi$, on leads 214, 216, and 218, respectively. These continuously improved angle measures, appearing on leads 210, 212, 214, 216, 218, are connected by leads 234 and 240, 236 and 238, 246, 244, 242, to resolvers 222 and 230, 220 and 232, 224, 226, 228, all respectively, in a stable feedback arrangement. That is, the corrections made in the respective angles by the angle measuring circuits 100 tend to reduce to zero the error signals detected by sense circuits 26 appearing on leads 194, 192 and 196.

It should be pointed out that the sequence of angles and their corresponding axes of rotation, for both the pointing coordinate transformation circuit 252 and the relative orientation coordinate transformation circuit 250, are not unique. That is, other angle definitions and rotation sequences can be used for either of the two transformations subject to their having the required pointing and relative orientation freedom.

It should be pointed out that the implementation of the invention can be done using state-of-the-art techniques using digital, analog or hybrid circuitry.

It should also be pointed out that whereas the invention might be also regarded as a unique five degree-of-freedom transducing system between two remotely separated independent coordinate frames, employing only one generating source in one of the coordinate frames and only one sensor in the other coordinate frame, that the system can easily be extended to provide a measure of the full six degrees-of-freedom by using two generating means. The second generating means would or could be located at another point in the coordinate frame of the first generating means, operating cooperatively with the first generating means on a time shared basis, thereby allowing the third translation coordinate, that of relative range, to be determined by triangularization, using the same computational techniques employed in the invention.

It should also be emphasized that the subject invention applies to a wide range of applications operable in domains from a few cubic feet or less to applications operable in domains of several cubic miles.

In the discussion above it is to be understood that the sense circuits 26 are internally supplied with the components of the reference excitation signals from sources 68, 70 and 140 in order to logically perform the discriminating sensing function required of their sensing circuits 26.

The resolvers which form components of the circuitry described herein may be fabricated, by way of example, in accordance with the teachings of U.S. Pat. Nos. 3,187,169 issued June 1, 1965, and 2,927,734 issued Mar. 8, 1960. The sensing circuits, again by way of example, may be fabricated in accordance with the teachings of a circuit diagram appearing at page 67 of the book entitled "Electronics Circuit Designers Casebook", published by Electronics, McGraw Hill, No. 14–6. The angle measuring circuitry may take the form of any of a vast number of well-known Type I Servomechanisms. There are, of course, numerous alternate constructions available for each of these components as will be readily appreciated by those skilled in the art.

It should now be apparent that a remote object tracking and orientation determination system capable of attaining the stated objects of the invention has been provided. The system and process of this invention utilizes a field for the purpose of determining tracking and orientation angles of a remote object very precisely relative to the coordinate frame of the apparatus which generates the field. With a two-dimensional nutation of the generated field, the tracking and orientation angles of the remote object in the plane of nutation may be determined. With a three-dimensional nutation, the direction to and the orientation of a remote object may be determined.

It will be appreciated by those skilled in the art, additionally, that (a) the raw output from the angle measuring circuitry will be useful in certain situations in an open looped system although ordinarily, for $\phi$, $\theta$ and $\Psi$ to be accurate, the generator must be pointing directly at the sensing means; and (b) absolute location and orientation (including distance) of an object relative to the reference source can be determined by utilizing two physically displaced generators such as that shown in FIG. 11 with appropriate receiving and output circuitry at the object.

While the invention has been described in detail as a system for tracking the movement and angular orientation of a generalized remote object, it should be readily apparent to one art-skilled that the invention may be used in a variety of object locating, tracking and orientation angle determination applications. One application currently in development is tracking the movement and orientation of an observers head, or more specifically, his line-of-sight for use in a Visually-Coupled-Control System. Other potential applications: a two-dimensional system might be employed with surface modes of transportation, such as in the docking of ships or maintaining proper distances between passenger cars in an automated public transportation system. Other aircraft navigation problems suitable for handling with the invention include airborne alignment of missle systems, automated coupling of boom-nozzle and receptacle for inflight refuelling of aircraft, formation flying, instrument landing of vertical take-off and landing craft, and the like.

While the above description treats preferred embodiments of the invention, it should be readily apparent that a variety of modifications may be made in the system and process within the scope of the appended claims.

The embodiments of the invention in which an exclusive property or privilege is claimed are defined as follows:

1. Apparatus for generating a nutating electromagnetic field which comprises:
   a. three orthogonal radiators adapted to pass a current; and
   b. means for supplying the appropriate mixture of signals from three sources, supplying a DC signal, a first AC signal and a second AC signal in phase quadrature with the first AC signal, respectively, to the three radiators such that the electromagnetic field produced by the currents in the three radiators is caused to nutate in a conical manner about an arbitrarily directed pointing vector of the field, the apex of the cone being at the intersection of the generating radiators.

2. Apparatus for generating a nutating electromagnetic field which comprises:
   a. at least two orthogonal radiators adapted to pass a current; and
   b. means for supplying the appropriate mixture of signals from sources supplying a DC signal, and a first AC signal to the radiators such that the electromagnetic field generated by the currents in the radiators is caused to nutate about an arbitrarily specified pointing vector of the field.

3. The apparatus of claim 2 in which the excitation signals cause the field to nutate in a nodding motion in a plane defined by the axes of the two radiators excited.

4. The apparatus of claim 2 in which there are three radiators and in which the signal source also supplies a second AC signal in phase quadrature to the first AC signal; and, means for supplying the appropriate mixture of each of the three source signals to the three radiators whereby the magnetic field is caused to nutate in a conical manner about an arbitrarily but specifically directed pointing vector of the field, the apex of the cone being at the intersection of the generating coils.

* * * * *